Aug. 10, 1943.    E. A. RUTLEDGE    2,326,686
VALVE AND MEANS FOR OPERATING THE SAME
Filed Aug. 3, 1940    3 Sheets-Sheet 2
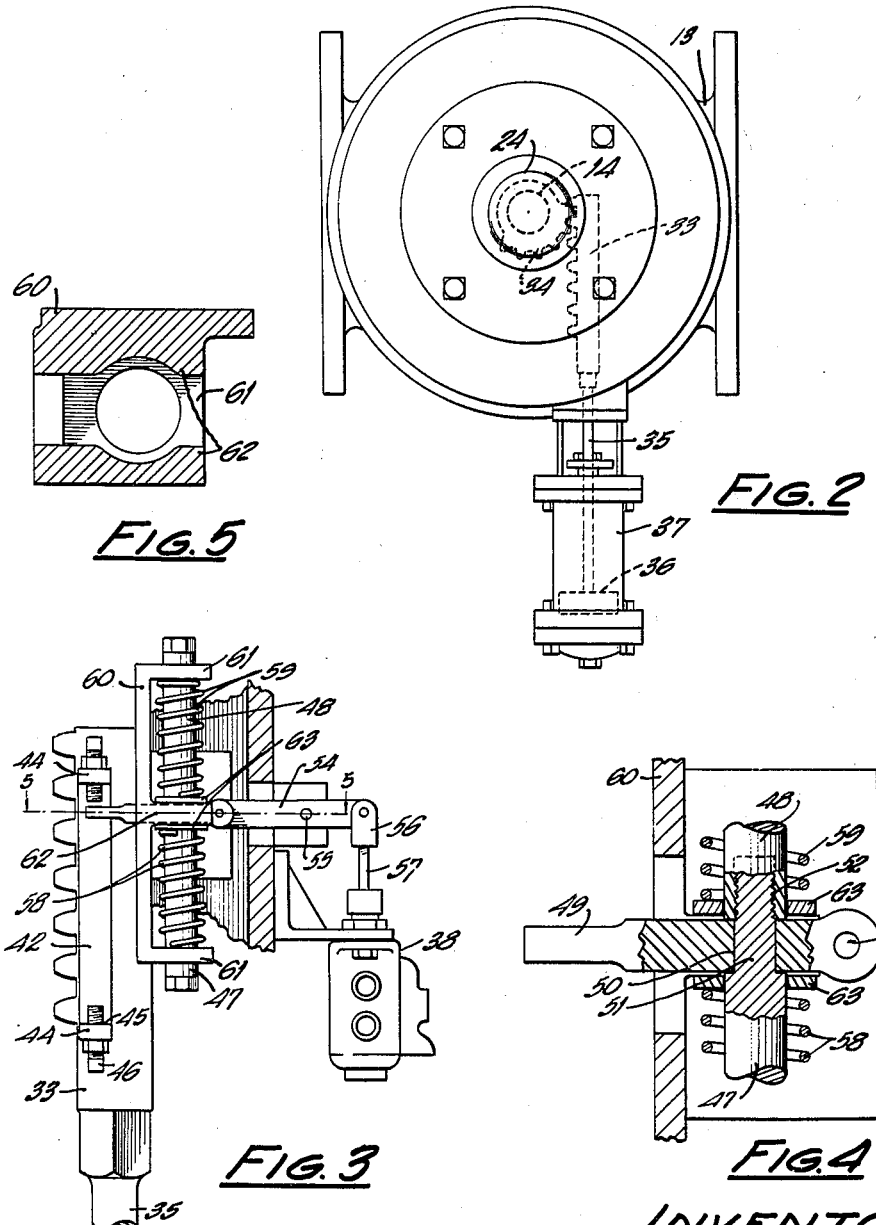
INVENTOR
Eric A. Rutledge
by David L. Wood
ATTORNEY INVENTOR
Eric A. Rutledge
by David L. Cond
ATTORNEY Patented Aug. 10, 1943

2,326,686

UNITED STATES PATENT OFFICE 2,326,686

VALVE AND MEANS FOR OPERATING THE SAME

Eric A. Rutledge, Troy, N. Y., assignor to Rensselaer Valve Company, Cohoes, N. Y., a corporation of New York Application August 3, 1940, Serial No. 350,563

4 Claims. (Cl. 137—139)

While not necessarily limited thereto, my invention is particularly useful in the operation of a cone valve provided with fluid pressure operated means for seating and unseating the valve and a second fluid pressure operated means for turning the valve.

In the embodiment of my invention illustrated, the control for both the fluid pressure operated mechanism for seating and unseating the cone valve and for the fluid pressure operated means for turning the valve comprises two four-way valves one of which is under the control of the operator and the other of which is under the control of the device which actuates the second control mechanism.

A device has hitherto been proposed in which two fluid pressure operated devices have been suggested, the one for seating and unseating the cone valve and the other for turning the same, and it has also been suggested that the operation of both of these devices be placed under the control of a four-way valve. So far as I am aware, however, no means have been provided in a system comprising a cylinder and its piston for operating the seating and unseating cylinders which equalizes pressure on opposite sides of the piston and therefore prevents operation of said piston while permitting operation of the means for turning the valve. With systems of the general character heretofore suggested, when the valve starts to operate, the complete cycle is carried out without reference to the angular position of the cone valve and with the result that the valve might pre-seat when not in the fully opened or closed position. A valve thus actuated is inoperative for all practical purposes.

In accordance with my invention means operable in response to the movement of the means for turning the cone valve are provided for trapping fluid on opposite sides of the piston which operates the mechanism at the limits of its movements for automatically bringing the piston in the plug raising and seating cylinder to neutral position.

My invention will best be understood by reference to the accompanying drawings in which I have illustrated a preferred embodiment thereof and in which Fig. 1 is a vertical section, partially in elevation, of a cone valve and its housing and the head therefor and showing somewhat diagrammatically the means cooperating with the actuating mechanism which turns the valve and which renders the fluid pressure operated means for seating and unseating the valve inoperative;

Fig. 2 is a front view of the means for turning the cone valve and in which the rack bar and the sector operated thereby are shown in dotted lines;

Fig. 3 is a plan view of the neutralizer which is mounted on the valve head and which is movable by the member which produces the turning movement of the cone valve, together with associated parts which render the fluid pressure operated means for seating and unseating the cone valve in-operative;

Fig. 4 is a section through the head of the valve and illustrating certain of the parts of the neutralizer in more detail;

Fig. 5 is a section taken along the line 5—5 of Fig. 3 with the finger omitted;

Like reference characters indicate like parts throughout the drawings.

Figure 1:
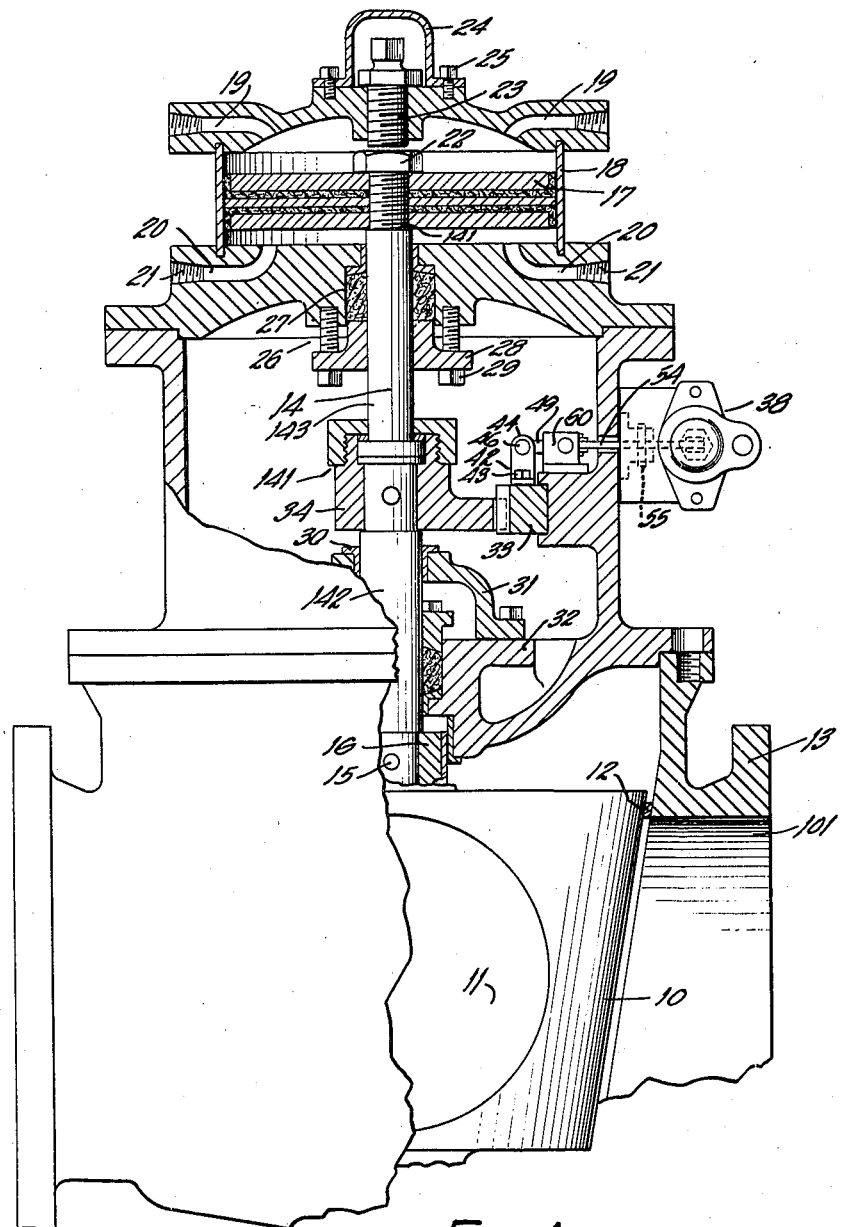

Referring to the drawings and first to Fig. 1, 10 is a cone or plug provided with a passage 11 therethrough and which is illustrated in Fig. 1 in the closed and seated position. When turned at right angles to the position illustrated, it provides communication between passage 101 and a passage not illustrated on the opposite side of the valve. Suitable seating rings 12 are provided between the valve member and its housing 13 as best indicated in Fig. 1.

The cone valve is actuated by a stem 14 which is pinned or otherwise secured at its lower end at 15 to a boss 16 with which the valve is provided. The upper end of the stem 14 is attached to a piston 17 in a cylinder 18 to the upper end of which fluid under pressure is introduced or released by a pipe or pipes 19. Fluid under pressure may likewise be introduced to or released from the lower side of the piston through a passage or passages 20 which are preferably provided with screw threads 21 to which a suitable pipe connection or connections may be made. The upper end of the valve stem 14 is preferably provided with a nut 22 which is threaded to the upper threaded end of the operating stem 14 as best shown in Fig. 1, to clamp the piston against a shoulder 141 on the stem 14. An adjustable threaded stop 23 is also attached to the top of the valve head the upper end of which may conveniently be enclosed by a cap 24 which may be secured on the upper end of the valve head by suitable bolts 25. The operating stem 14 of the valve is provided with a swivel coupling indicated generally at 141, which divides the stem into a lower section 142, which may be rotated independently of the upper section 143, the arrangement being such that any axial movement of the valve stem must be made as a unit. A gland indicated generally at 26 surrounds the valve stem in a recess 27 surrounding the same. The lower side of the gland may be closed by a closing element 28 to which pressure may be applied by nuts 29 in the usual and well known manner.

The valve stem 14 is preferably seated in a bearing sleeve 30 which is in turn received in a bracket 31 which may conveniently be secured to the body 32 which may also constitute a cover for the valve.

In the embodiment of my invention here illustrated the means for turning the valve comprises a rack bar 33 the teeth of which engage a sector 34 (Fig. 2) which is secured to the lower section 142 of the valve stem, the upper section of the valve stem being secured to the piston 17, as heretofore stated.

The means for controlling the operation of the two fluid pressure operated devices, the one for seating and unseating the valve, and the other for turning the same comprises two four-way valves indicated generally and schematically at 38 and 39, the four-way valve 38 comprising a plug 381 and the valve 39 comprising a plug 391 of the form shown in Figs. 6 to 10 inclusive. It will, of course, be understood that other types of four-way valves may be used. The valve plug 381 is actuated by mechanism that will now be described and the valve 391 is under the control of the operator and may be actuated manually or by means of a solenoid or the like.

In order to provide means for disabling the fluid pressure operated means for the seating and unseating of the valve, a neutralizer is provided comprising a bracket 42 formed of bronze or other non-corrodible metal secured to the rack bar 33 by bolts 43 (Fig. 1) and is provided at its ends with upstanding lugs 44 each of which is provided with a hole 45 in which suitable threaded set screws 46 are secured.

Two rods 47 and 48 are suitably secured together by a threaded connection as best shown in Fig. 4. A finger 49 is provided with an opening 50 which receives a contracted portion 51 of the rod 47, the end of the rod 47 being screw threaded into a recess 52 in the end of the rod 48. The position of the finger 49 with respect to the bracket 42 is such that the end of the finger will contact with either of the adjustable set screws 46. The finger 49 is thus bodily movable with respect to the bracket on which it is mounted. The other end of the finger 49 is provided with an opening 53 to which is connected a lever arm 54 (Fig. 3) pivoted at 55 and the end of which is connected to a clevis 56 which receives a stem 57 which actuates the four-way valve 38 which, in turn, controls the flow of fluid to the seating and unseating cylinder 18.

The neutralizer also comprises a bracket 60 which is mounted on the valve head and comprises end lugs 61 and a center lug 62. The neutralizer also comprises the finger 49, rods 47 and 48, washers 63, and compression springs 58 and 59.

When the cone valve is in the fully open or fully closed position the rack 33 may be either in one extreme position or the other and the finger 49 contacts either of the set screws 46 thereby forcing the finger in either direction against the spring tension of either of springs 58 or 59 which surround the rods 47 and 48, respectively, and are placed under and held in compression between the end lugs 61 and center lug 62 and washers 63 which surround the rods 47 and 48 adjacent the finger 49. As rod 47 is contracted near one end, it forms a shoulder for the finger and the two rods thereby hold the finger fixed in position with respect thereto, and any longitudinal movement of the rods 47 and 48 produces a bodily movement of the finger 49. The springs 58 and 59 are placed under compression by the travel of the finger and the travel of the finger 49 is usually preferably about one-half inch. Therefore, when the finger 49 engages the one set screw or the other 46 at its limit of movement, the spring load on the spring which is further compressed may be approximately 60 or 70 pounds. The other spring is held in place by the center lug 62 and the washer 63. It, therefore, has no effect on the spring which has not been further compressed by the fact that the finger has been guided off center.

Figure 8:
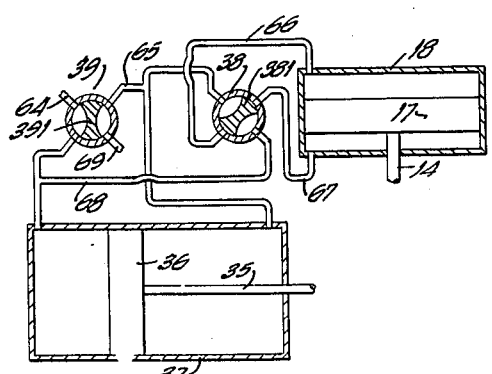
Fig. 8 illustrates the position of the four way valves, operating pistons, and direction of pressure when the plug is unseated and closing, and pressure is equalized on both sides of the seating and unseating piston.

So long as the finger 49 is off center, it rotates the lever 54 and correspondingly moves the stem 57 which is connected to the four-way valve 38 thereby moving the plug 381 in the four-way valve to the position indicated in Fig. 8, to cut off the flow of fluid under pressure to the cylinder 18 thereby trapping fluid in cylinder 18 on opposite sides of the piston 17 and preventing movement of the piston 17. It will be noted that the movement of the finger 49 in either direction will have the same effect on the plug 381.

Figure 6:
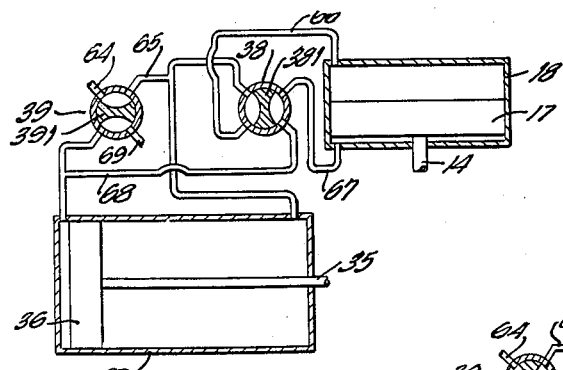
Fig. 6 is a diagrammatic view illustrating the fluid pressure operated means for seating and unseating the valve and the means for turning the same in the positions which they occupy when the valve is fully seated and open.

Figs. 6 to 10 inclusive indicate the positions of the four-way valves and the connections leading therefrom to the respective cylinders 18 and 37. The operator first moves the plug in the four-way valve 39 to the position indicated in Fig. 6 thereby permitting fluid under pressure to flow from the inlet pipe 64 through the four-way valve 39 to a pipe connection 65, one branch of which is connected to the four-way valve 38 and through the pipe connection 66 to the upper end of the cylinder 18 thereby operating the piston 17 and the stem 14 connected to the piston which is in turn connected to the cone or plug 10 and thus moves the same to the seated position. At the same time the piston 36 in the cylinder 37 is at the extreme left as shown in Fig. 6 and the rack bar illustrated in Fig. 2 is at the outer end of its movement and the cone valve is seated in the open position. At the same time fluid is exhausted from the cylinder 18 through the pipe connection 67 to the four-way valve 38 thence through a connection 68 and through the four-way valve 39 to waste at 69. Similarly, fluid under pressure is exhausted from the right hand end of the cylinder 37 through a pipe connection leading to the four-way valve 39 and to exhaust.

Figure 7:
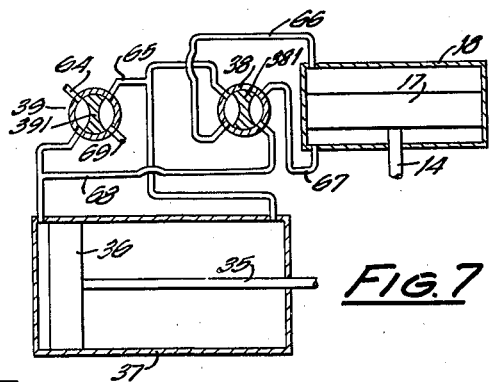
Fig. 7 illustrates the four way valves, operating pistons, and direction of pressure when the plug is unseating and starts to close.

Fig. 7 illustrates the position of the four-way valves and the operating pistons when the plug is unseating and starts to close. In the position here illustrated, fluid under pressure passes from the inlet pipe 64 to the four-way valve 39, pipe connection 68 and four-way valve 38 to the lower side of the piston 17. At the same time fluid under pressure passes to the left hand end of the cylinder 37 thereby starting the piston 36 in a direction to close the valve 10. At the same time pressure is relieved at the top of the cylinder 18 through the four-way valve 39 and to the waste pipe 69. The right hand end of the cylinder 37 is also exhausted through a pipe connection leading from the right hand end of the cylinder to the valve 39 and to waste.

Fig. 8 illustrates the position of the four-way valve 39 and operating pistons when the cone valve is unseated and closing and the openings leading from the four-way valve 38 to the upper and lower side of the piston 17 are closed, the plug 381 having been moved to a position where it closes the pipes 66 and 67 leading to the respective sides of the piston 17. At the same time plug 391 in the four-way valve 39 remains in the position to admit fluid under pressure to the left end of the cylinder 37 and to relieve pressure from the opposite end thereof to the four-way valve 39.

Figure 9:
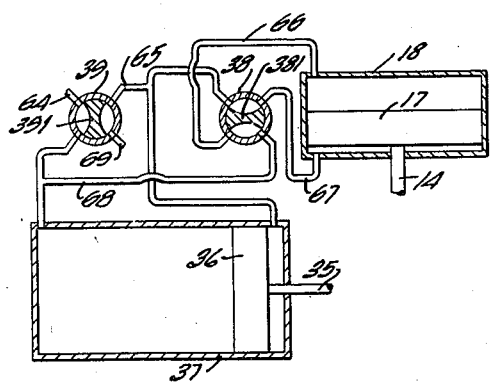
Fig. 9 illustrates the position of the four way valves, operating pistons, and direction of pressure when the plug is seated in the closed position.

Fig. 9 illustrates the four-way valves and the pistons in their respective cylinders 18 and 37 in the positions which they occupy when the cone valve is seated in the closed position.

Figure 10:
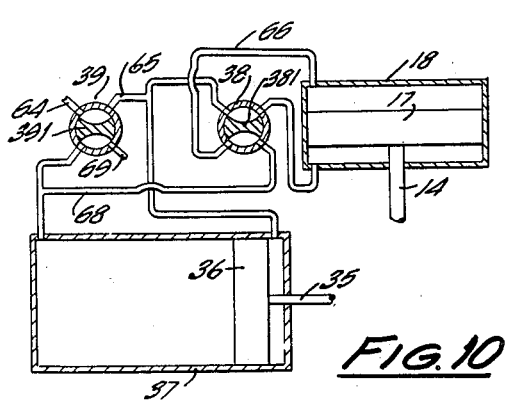
Fig. 10 illustrates the position of the four way valves, operating pistons, and direction of pressure when the plug is unseating and starts to open.

Fig. 10 illustrates the position of the four-way valves and the operating pistons when the plug is unseating and starts to open. At this time the plug in the four-way valve 39 is in a position to admit fluid under pressure from the inlet pipe 64 to the right hand end of the cylinder 37 and the four-way valve 38 is in a position to admit fluid under pressure from the inlet pipe 64 to the lower end of the cylinder 18 beneath the piston 17.

Fluid under pressure passes from inlet pipe 64 to the right hand end of cylinder 37 thereby starting the main valve to open. The left hand end of the cylinder 37 and the upper end of cylinder 18 communicate with waste through the valve 39.

In case it is desired to return the cone valve to its initial operating position without the necessity of completing the cycle of operation it is only necessary for the operator to throw the manually operated valve 39 to the position shown in Fig. 7. Then when automatically operated valve 38 arrives at the position shown in Fig. 8 through the operation of the cone valve, fluid is trapped in the ends of the cylinder 18, and further axial movement of the cone valve is prevented.

While I have illustrated my invention in connection with a cone valve, it will be understood that it is not limited thereto although the situation does not ordinarily arise with a valve other than a cone valve for applying my invention.

While I have described my invention in its preferred embodiment, it is to be understood that the words which I have used are words of description rather than of limitation. Hence, changes within the purview of the appended claims may be made without departing from the true scope and spirit of my invention in its broader aspects.

What I claim is:

1. In a device of the character described, a cone valve rotatable between two operative positions, a source of fluid under pressure, a first fluid operated motor connected to rotate said cone valve, a second fluid operated motor connected to seat and unseat said cone valve, a secondary valve for controlling flow of fluid to and exhaust of fluid from said second motor, a primary valve to control flow of fluid from said source to and exhaust of fluid from said first motor and said secondary valve; said cone valve being connected to operate said secondary valve from an open position, in which fluid is supplied to said second motor to unseat the cone valve, to a closed position of said secondary valve, in which supply of fluid to and exhaust of fluid from said second motor is prevented, upon initiation of rotation of said cone valve from either of its said operative positions; and said cone valve being also connected to operate said secondary valve from said closed position to a second open position, in which fluid is supplied to said second motor to seat said cone valve, as said cone valve is rotated to approach either of its said operative positions.

2. In a device of the character described, a cone valve rotatable between two operative positions, a source of fluid under pressure, a first fluid operated motor connected to rotate said cone valve, a second fluid operated motor connected to seat and unseat said cone valve, a secondary valve for controlling flow of fluid to and exhaust of fluid from said second motor, a primary valve to control flow of fluid from said source to and exhaust of fluid from said first motor and said secondary valve; said cone valve being connected to operate said secondary valve from an open position, in which fluid is supplied to said second motor to unseat the cone valve, to a closed position of said secondary valve, in which supply of fluid to and exhaust of fluid from said second motor is prevented, upon initiation of rotation of said cone valve from an operative position; and said cone valve being also connected to operate said secondary valve from said closed position to a second open position, in which fluid is supplied to said second motor to seat said cone valve, as said cone valve is rotated to approach said operative position.

3. In a device of the character described, a cone valve rotatable between two operative positions, a source of fluid under pressure, a first fluid-operated motor connected to rotate said cone valve, a second fluid-operated motor connected to seat and unseat said cone valve, a secondary valve operable in response to the movements of said first fluid-operated motor for controlling flow of fluid to and exhaust of fluid from said second motor, a manually-operable primary valve to control flow of fluid from said source to and exhaust of fluid from said first motor and said secondary valve, said cone valve being connected to operate said secondary valve from an open position, in which fluid is supplied to said second motor to unseat the cone valve, to a closed position of said secondary valve, in which supply of fluid to and exhaust of fluid from said second motor is prevented upon initiation of rotation of said cone valve from an operative position; and said cone valve being also connected to operate said secondary valve from said closed position to a second open position in which fluid is supplied to said second motor to seat said cone valve, as said cone valve is rotated to approach either of the said operative positions.

4. In a device of the character described, a cone valve having a stem with a swivel connection therein dividing the same into two sections, one of said sections being rotatable between two operative positions and both sections being longitudinally movable as a unit, a gear sector mounted on said rotatable section, a source of fluid under pressure, a first fluid-operated motor having a rack engaging said sector to rotate said cone valve, a second fluid-operated motor connected to seat and unseat said cone valve, a secondary valve for controlling flow of fluid to and exhaust of fluid from said said second motor, a primary valve to control flow of fluid from said source to and exhaust of fluid from said first motor, and said secondary valve; said cone valve being connected to operate said secondary valve from an open position in which fluid is supplied to said second motor to unseat the cone valve, to a closed position of said secondary valve in which supply of fluid to and exhaust of fluid from said second motor is prevented upon an initiation of rotation of said cone valve from either of its said operative positions; and said cone valve being also connected to operate said secondary valve from said closed position to a second open position in which fluid is supplied to said second motor to seat said cone valve, as said cone valve is rotated to approach an operative position.

ERIC A. RUTLEDGE.